United States Patent [19]

Göring et al.

[11] 4,210,057
[45] Jul. 1, 1980

[54] ANCHORING DOWEL WITH DETENT LUGS

[75] Inventors: Hermann Göring, Riegel; Hansjörg List, Waldkirch; Klaus Brunswig; Winfried Labatzke, both of Emmendingen, all of Fed. Rep. of Germany

[73] Assignee: Upat GmbH & Co., Emmendingen, Fed. Rep. of Germany

[21] Appl. No.: 839,588

[22] Filed: Oct. 5, 1977

[30] Foreign Application Priority Data

Oct. 6, 1976 [DE] Fed. Rep. of Germany ....... 2644963
Oct. 8, 1976 [DE] Fed. Rep. of Germany ....... 2645432

[51] Int. Cl.² ............................................. F16B 13/02
[52] U.S. Cl. ................................................... 85/83
[58] Field of Search ................. 85/82, 83, 84, 85, 73, 85/74, 75, 76

[56] References Cited

U.S. PATENT DOCUMENTS

| 3,236,145 | 2/1966 | Schenkel | 85/83 |
| 3,383,976 | 5/1968 | Schenkel | 85/83 |
| 3,413,887 | 12/1968 | Von Wolff | 85/83 |

FOREIGN PATENT DOCUMENTS

| 1909099 | 3/1970 | Fed. Rep. of Germany | 85/83 |
| 2029407 | 12/1971 | Fed. Rep. of Germany | 85/83 |
| 556979 | 12/1974 | Fed. Rep. of Germany | 85/83 |
| 2454022 | 5/1976 | Fed. Rep. of Germany | 85/83 |
| 1218095 | 1/1971 | United Kingdom | 85/83 |
| 1221702 | 2/1971 | United Kingdom | 85/83 |

*Primary Examiner*—Ramon S. Britts
*Attorney, Agent, or Firm*—Michael J. Striker

[57] ABSTRACT

An anchoring dowel has detent lugs which are yieldably connected to a body portion of the anchoring dowel at a merger region and project outwardly beyond the outer circumferential surface of the body portion in a relaxed condition while being at least partly received in a depression of the body portion when the anchoring dowel is inserted into an anchoring hole of a support structure. The lug has an outer face of a saddle-shaped configuration which merges with the outer circumferential surface of the body portion at the merger region, an elongated side face which commences at and merges into a generatrix of the outer circumferential surface at its end which is close to the leading end of the anchoring dowel and having a concave configuration, and an arcuate end face which extends from the merger region in a circumferential direction of the body portion and is curved in the same manner as the outer circumferential surface of the body portion.

14 Claims, 10 Drawing Figures

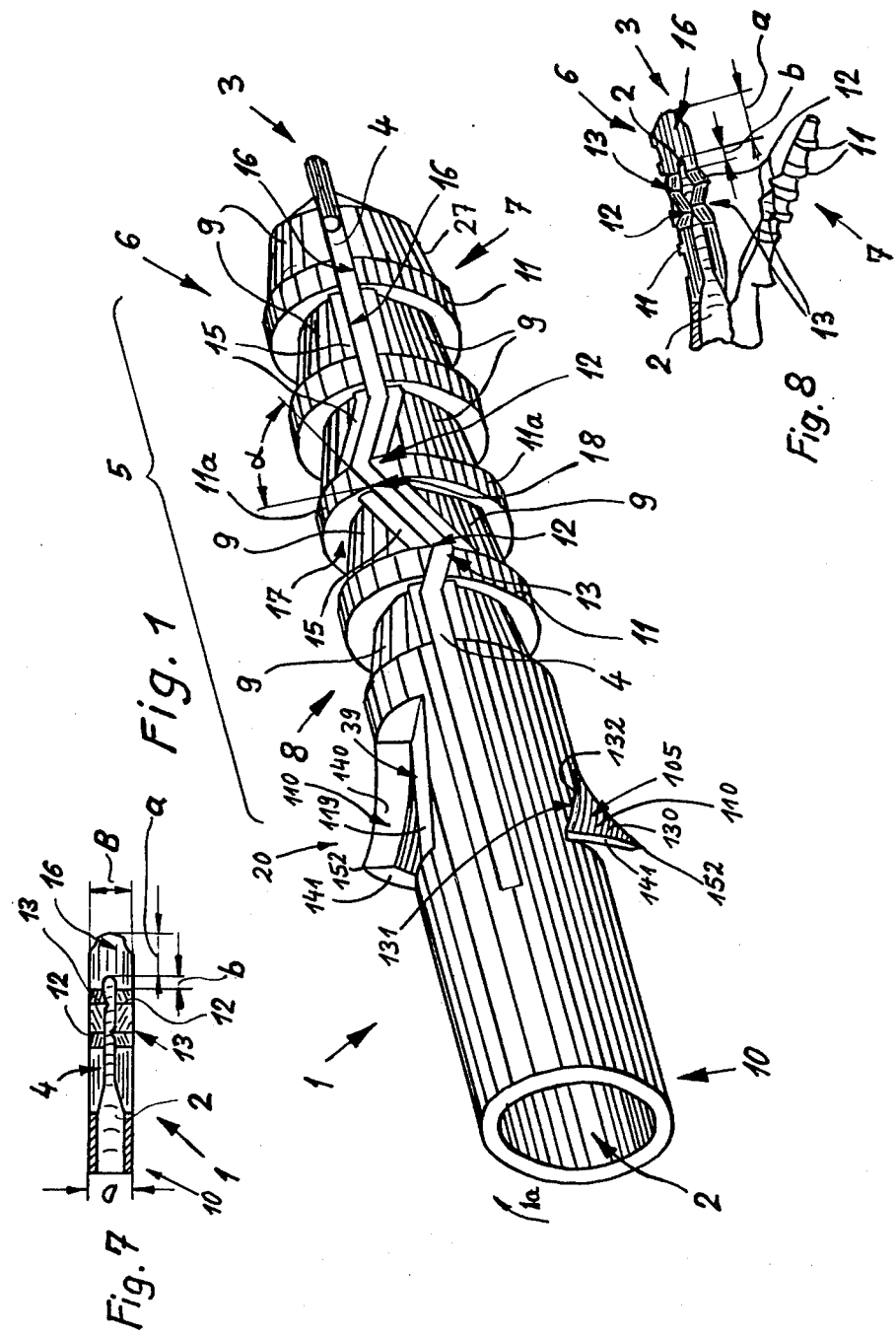

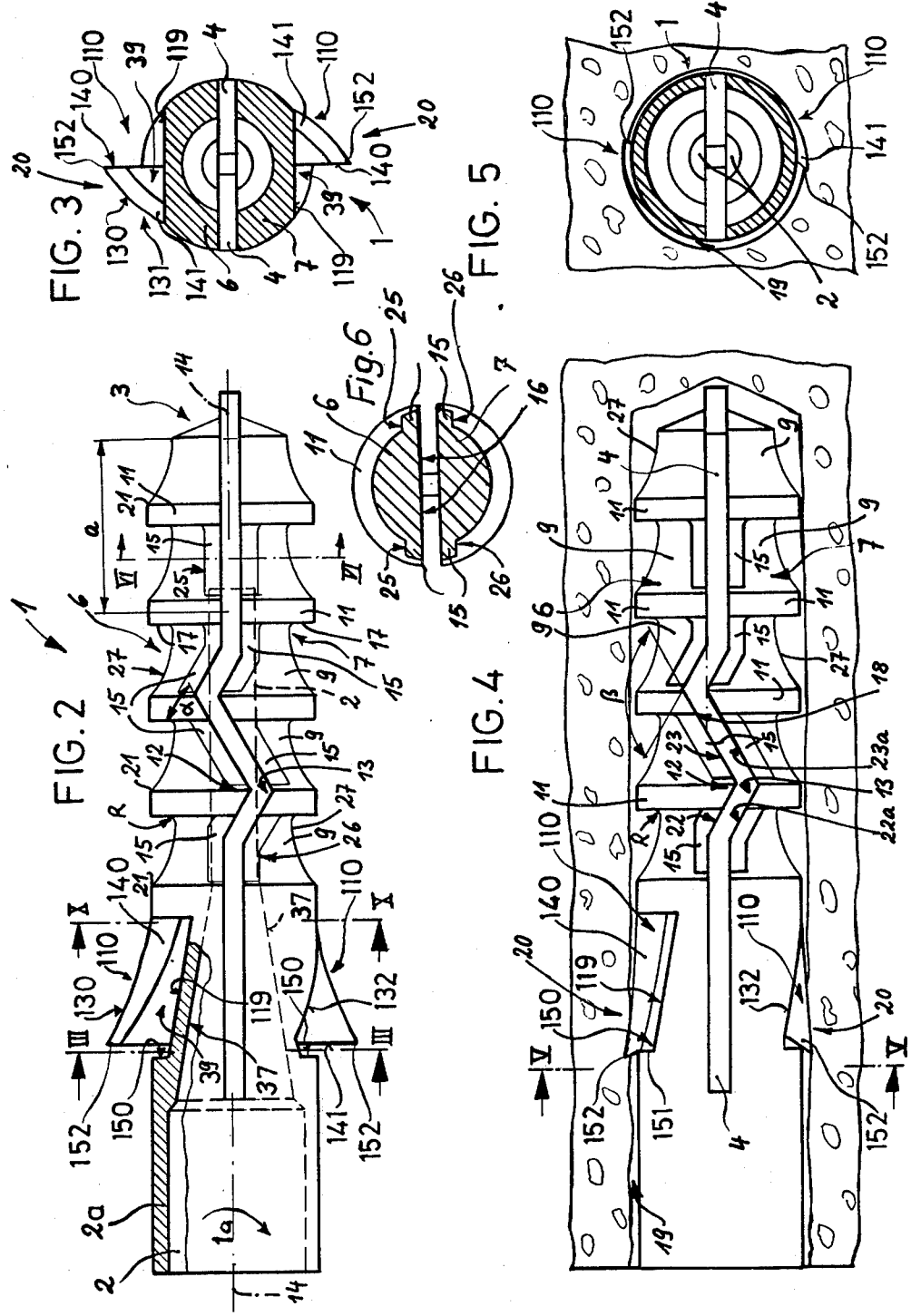

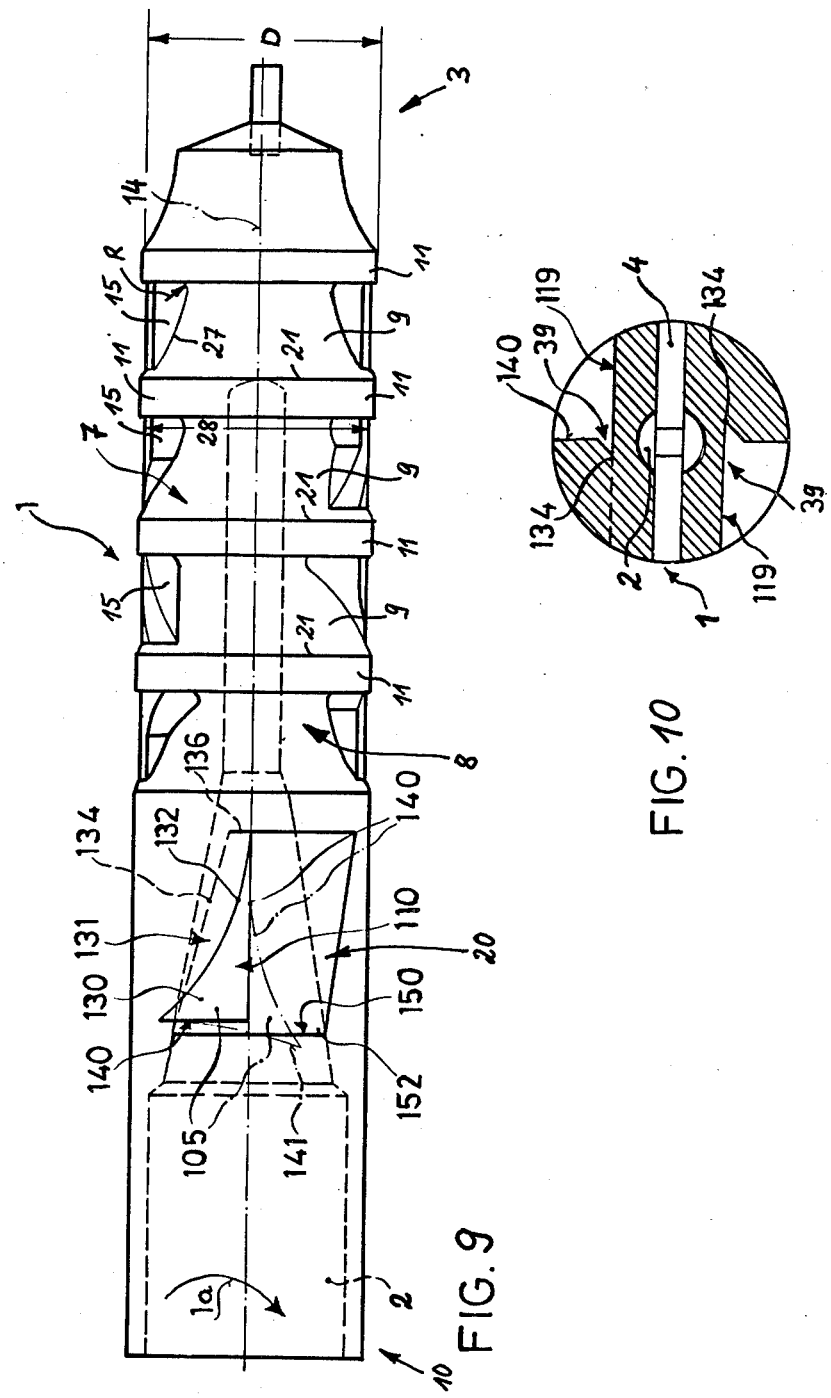

ANCHORING DOWEL WITH DETENT LUGS

BACKGROUND OF THE INVENTION

The present invention relates to an anchoring dowel in general, and more particularly to an anchoring dowel made of synthetic plastic material.

There are already known anchoring dowels of various constructions, among them such into which threaded elements, such as screws, are threaded when the anchoring dowel is received in an anchoring hole of a support structure to which an object is to be attached by means of the anchoring dowel and of the screw threaded thereinto. Such dowels are to be used in support structures of various thicknesses so that, depending on the thickness of the particular support structure, the anchoring dowel is either fully received in the support structure, or the leading end thereof projects beyond the rear major surface of the support structure and engages behind the same. The anchoring dowels of this construction have spreading portions either commencing at the leading end of the anchoring dowel, or located in the central region of the anchoring dowel intermediate the leading and trailing ends thereof, such spreading portions or sections being separated from one another by slots which are usually straight and extend in the longitudinal direction of the anchoring dowel.

It is well known that the dowel of the above-discussed construction, when received in the anchoring hole of the support structure, has a tendency to be entrained by the screw or other threaded element being threaded thereinto for joint turning therewith, rather than remaining stationary in the anchoring hole and thus permitting the threading of the threaded element into the internal passage of such anchoring dowel. To avoid this possibility of entrainment, it has already been proposed to equip the anchoring dowels with detent lugs which engage the support structure at the anchoring hole and keep the anchoring dowel stationary relative to the support structure. Thus, it has already been proposed to equip the anchoring dowel with outwardly projecting resilient lugs which are yieldably connected to the body portion of the anchoring dowel and engage the surface bounding the anchoring hole in the support structure. In this connection, it is also already known to let the detent lugs extend from the body portion in the longitudinal and circumferential direction of the body portion, and particularly in the direction of threading of the threaded element into the internal passage of the anchoring dowel.

It has also already been proposed, for instance, in a German Utility Patent DT-GBM 19 64 527, to manufacture the anchoring dowel in one piece with the projecting detent lugs from synthetic plastic material in an injection molding process. This anchoring dowel has approximately triangular wings which are arranged at the border of the slot which separates the spreading sections from one another. When the threaded element, such as a screw, is being threaded into the internal passage of the dowel, the attendant loading of these wings can easily result in a deformation of the spreading sections, which can then result in an impairment of the guidance of the threaded element during the threading thereof into the internal passage of the anchoring dowel. Furthermore, anchoring dowels of this type are not suited for use in thin-walled support structures in which the leading end of the anchoring dowel extends beyond the support structure, nor do they readily lend themselves to the considerably force-resistant dimensioning of the wings.

On the other hand, there is also already known a spreadable anchoring dowel disclosed, for instance, in the German Patent DT-PS 1 909 098 which has an internal passage of diminishing transverse dimensions toward the leading end of the anchoring dowel into which a connecting screw or the like can be threaded, such anchoring dowel having, over a part of its length, separate spreading sections. This anchoring dowel is further equipped with resiliently yieldable detents which extend outwardly beyond the outer circumference of the body portion of the anchoring dowel in their relaxed condition. Such detents are elastically connected, at one longitudinal side of each, with the body portion of the anchoring dowel, and each of the detents extends substantially tangentially of the body portion and in the threading direction of the threaded element. The region of the detent which is closer to the leading end of the body portion conforms to the circumferential shape of the body portion, and the detent extends from there both in the direction to the trailing end of the body portion and in the direction of threading of the screw, gradually increasing in distance from the body portion in these directions. The anchoring dowel of this type, or the body portion thereof, has a depression which is capable of accommodating at least a part of the respective detent in a deformed position thereof. The respective detent of this anchoring dowel is shaped as a substantially rectangular lug which is delimited by slits extending substantially transversely of the longitudinal axis of the body portion and separating the lugs from the latter. The respective lug is yieldably connected to the body portion at its merger region which is located at that side of the lug which faces opposite to the threading direction, the lugs being arranged centrally on the spreading sections in the region of the converging region of the internal passage of the body portion. This detent lug, when in its relaxed position, has its end face that faces in the threading direction increase in distance toward the trailing end of the anchoring dowel, and its end which face toward the trailing end of the anchoring dowel also increase in distance in a gradual fashion so that these two faces bound a corner region which, in the relaxed position, extends outwardly beyond the generally cylindrical contour of the body portion of the anchoring dowel. A pocket-shaped depression is arranged underneath the detent lug, the depression being capable of fully accommodating the detent lug over its entire circumference, the bottom surface of this depression, related to the transverse direction of the dowel, extending substantially parallel to the longitudinal central plane of the slot of the dowel as well as, related to the axial direction of the dowel, inclinedly to the leading end of the anchoring dowel.

While the dowel of this type performs its function to satisfaction in most circumstances and particularly avoids the drawbacks which have been discussed above in connection with the first-discussed anchoring dowel, it still leaves much to be desired, particularly since it is not suited for all applications, it is quite difficult to manufacture and thus expensive, and it is quite difficult to introduce it into the anchoring hole of the support structure.

SUMMARY OF THE INVENTION

Accordingly, it is a general object of the present invention to avoid all of the disadvantages of the prior art.

More particularly, it is an object of the present invention to so construct an anchoring dowel as not to be possessed of the disadvantages of the prior-art anchoring dowels.

A further object of the present invention is to design an anchoring dowel which is simple in construction, easy to manufacture, and reliable nevertheless.

A yet another object of the invention is to develop an anchoring dowel equipped with detent lugs which have sharp detent edges adapted to engage the surface bounding the anchoring hole of the support structure and thus prevent joint rotation of the anchoring dowel with the threaded element being threaded thereinto.

A concomitant object of the present invention is to provide an anchoring dowel which can be easily introduced into the anchoring hole of the support structure regardless of whether the anchoring hole is a blind hole or a through hole the length of which is smaller than that of the anchoring dowel.

In pursuance of these objects and others which will become apparent hereafter, one feature of the present invention resides, briefly stated, in an anchoring dowel which comprises, in combination, an elongated body portion having a leading end, a trailing end and an outer circumferential surface which is curved in cross section; and at least one detent lug yieldably connected to said body portion at a merger region and projecting outwardly beyond said outer circumferential surface of said body portion at least in a relaxed condition, said lug having an outer face of substantially saddle-shaped configuration which merges with said outer circumferential surface of said body portion at said merger region, an elongated side face commencing at and generally merging into a generatrix of said outer circumferential surface at its end which is closer to said leading end and having a concave configuration, and an arcuate end face extending from said merger region generally in a circumferential direction of said body portion and being curved in the same manner as said outer circumferential surface of said body portion. The anchoring dowel is preferably to be used with a threaded element which is partially threadingly received in an internal passage of the body portion, and then the above-mentioned circumferential direction is the threading-in direction of the threaded element. Advantageously, the lug is of one piece with the body portion, both being of the same resiliently yieldable material, such as synthetic plastic material. Furthermore, the body portion may have a depression juxtaposed with the lug and operative for receiving at least the greater part of the lug when the latter is subjected to inwardly oriented forces.

As a result of the above-discussed measures, at least the outer face of the lug obtains such a shape that a particularly sharp edge forms at the free corner region of the lug. The sharpness of the edge is instrumental in letting the detent lug dig into the material of the support structure even in the extreme situation when the material of the support structure into an anchoring hole of which the anchoring dowel is introduced is relatively hard, such as concrete, as well as when such material is relatively soft, for instance, foamed concrete, plaster or sheet rock. In addition thereto, the anchoring dowel can be introduced into the anchoring hole of the support structure with relative ease and by resorting to the application of only a minimum force to the dowel at least during the first phase of introduction of the part of the dowel including the detent lug into the anchoring hole, without sacrificing the detention capacity of the detent lug after the full introduction of the anchoring dowel into the anchoring hole. In addition thereto, the configuration of the detent lug which differs from the previously known lug configurations has the advantage that the desired properties of the detent lug can be achieved even when the anchoring dowel is made of different materials which have properties varying within a broad range.

An advantageous aspect of the present invention resides in the fact that at least the outer face of the lug is delimited at the merger region by a crease which is curved and deviates from the elongation of the body portion in said circumferential direction. The somewhat curved shape of the crease, on the one hand, contributes to the rigidity of the detent lug; on the other hand, this curved outline of the crease influences the resistance which is encountered during the introduction of the anchoring dowel into the anchoring hole in such a sense that such resistance gradually increases with the extent of introduction of the anchoring dowel into the anchoring hole. Thus, this resistance is initially relatively small and increases gradually, slowly at first.

In many instances, the anchoring dowels of the type here under consideration are equipped with an internal passage for the threaded element which has a conically converging zone in the region of the detent lug. Furthermore, it is also already known, in such anchoring dowels, to provide pockets or depressions underneath the respective detent lugs which are adapted to accommodate at least the greater part of the respective detent lug. In this context, a further concept of the present invention resides in the fact that the bottom surface of the depression extends substantially parallel to the incline of the conical zone of the internal passage. In this manner, there is obtained an advantageous utilization of the available space which renders it possible to make the detent lugs sturdy and of substantial dimensions.

According to a further advantageous facet of the present invention, the bottom face of the depression extends at least at a zone thereof which is closer to the leading end beyond a projection of the above-mentioned crease onto the bottom surface, being delimited by a pivot line thereat, the pivot line being inclined in the above-mentioned circumferential direction with respect to the elongation of the body portion. In this manner, it is achieved that the entire detent lug, as considered in the circumferential direction of the anchoring dowel, is somewhat elongated and, for all intents and purposes, consists of two regions. One of the two regions is constituted by a triangular region of the lug and is quite easy to pivot, the other region being constituted by the extension of the bottom surface of the depression beyond the above-mentioned projection of the crease onto the bottom surface, this other region being located outside the triangular region and at its side which is opposite to the threading-in direction of the screw. This other region, or merger region, is relatively stiff. In this context, it is very advantageous when the pivot line is inclined in the circumferential direction with respect to elongation of the body portion; however, the pivot line is configurated differently from the crease so that the merger region delimited by these two lines is deformed in a certain fashion to be discussed later on when the lug is being displaced between its relaxed and loaded position.

In contradistinction thereto, the detent lugs of the prior-art anchoring dowels are usually so hinged that they conduct a pivoting movement about a longitudinally extending axis which substantially corresponds to the elongation of the merger region of the detent lug with the body portion of the anchoring dowel. On the other hand, a special pivoting and bending zone is obtained in the anchoring dowel of the present invention, which is delimited at the outer face of the detent lug by the above-mentioned curved crease, and at the lower side of the detent lug by the pivot line delimiting the bottom surface of the depression, this pivot line of the depression deviating from the projection of the crease onto the bottom surface of the depression. Advantageously, as far as the general direction of the extension is concerned, the pivot line delimiting the bottom surface of the depression and the curved crease have approximately the same inclination relative to the longitudinal axis of the anchoring dowel. As a result of the different position of the pivot line delimiting the bottom surface of the depression with respect to the curved crease, there is obtained a somewhat yieldable but not too weak pivotability of the detent lug. Based on the above-mentioned inclined position of the general extension of the crease and of the pivot line relative to the longitudinal axis of the body portion of the anchoring dowel, it is achieved that the pivotable displacement especially of the free corner region of the detent lug does not take place exactly along a transverse plane of the anchoring dowel; rather, the free corner region of the detent lug conducts a movement which has a component, however slight, in the direction toward the trailing end of the anchoring dowel. Thus, according to a further advantageous concept of the present invention, the corner region of the detent lug which is delimited by the above-mentioned side and end faces is so arranged that it abuts against an abutment region of the circumferential surface outside of the depression when the lug is subjected to inwardly oriented forces. Under these circumstances, the detent lug does not hinder the introduction of the anchoring dowel into the anchoring hole, even when the anchoring hole is a through hole in a relatively thin support structure; on the other hand, the detent lug and particularly its sharp corner region or tip can perform its function of detaining the anchoring dowel both against rotation in the anchoring hole and against extraction therefrom.

According to a further advantageous aspect of the present invention, the detent lug is so configurated that the side face thereof extends substantially parallel to a longitudinal plane of the body portion in the relaxed condition of the lug, the side face extending substantially parallel to the longitudinal plane only at the above-mentioned one end thereof and gradually deviating from the longitudinal plane in the above-mentioned circumferential direction towards its free other end when the lug is subjected to inwardly oriented forces and thus assumes a loaded position at least partially within the depression of the body portion. This shape of the detent lug, among others, enhances the sharpness of the free tip of the detent lug which is especially advantageous for digging into the material of the support structure in the anchoring hole. In addition thereto, the stability of the detent lug with respect to loads acting in the circumferential direction is improved as compared to that of other anchoring dowels under similar conditions when the detent lug is configurated in the above-discussed manner.

Advantageously, the tip of the lug which is located at the above-mentioned other end of the side face is delimited by the latter and by the end face of the lug, and the body portion has an abutment surface at a last third of the depression as considered in the circumferential direction against which the tip abuts in the loaded position thereof. A very advantageous arrangement is obtained when the above-mentioned longitudinal plane bisects a respective spreading section provided at the leading end of the body portion. Such a detent lug has a relatively large operating range. Thus, even when the anchoring hole in the support structure into which the anchoring dowel is to be introduced is somewhat greater in diameter than required, the detent lug is capable of performing its function because of the fact that it extends to a substantial distance beyond the outer circumferential surface of the body portion. On the other hand, the detent lug is accommodatable in the depression, except possibly for the tip thereof which abuts from the outside against the outer circumferential surface of the body portion.

A further concept of the present invention resides in the fact that the leading end of the body portion has substantially longitudinally extending slots which subdivide the leading end into at least two spreading sections which have respective projections and recesses bounding the slots at longitudinally central regions of the spreading sections. Advantageously, the projections of one of the spreading portions extend into the respective recesses of the other spreading portion to give the slots zig-zagged configurations in the central regions thereof. Preferably, the projections and recesses have substantially triangular configurations, especially corresponding to isosceles triangles. In addition thereto, the spreading sections may have ridges which extend along the slots and follow the zig-zagged configurations of the slots in the central region. The ridges have bounding surfaces which immediately bound the slots at the spreading sections, and the ridges extend to a lesser radial distance than annular retaining collars which are provided on the leading end of the body portion and are separated by intermediate portions. Then, the bounding surfaces which face the collars extend substantially parallel to the respective slots.

A further concept of the present invention resides in the fact that the slots so bisect at least one of the collars that a face of the one collar which faces toward the trailing end encloses acute angles with the slots. The projections and recesses have respective corners which are located at least at the one collar, preferably at the other face of the collar which faces toward the leading end. Thus, the slots together with the above-mentioned one face of the one collar bound edges on the one collar which point in the above-mentioned threading-in direction. Preferably, each of the spreading sections has only one of the projections and one of the recesses at the respective slot, the projections and recesses being so distributed that the spreading sections have the same configuration. The projections and recesses are respectively bounded by border surfaces which enclose an angle of between 100° and 140°, preferably 120°, with one another.

The intermediate portions advantageously concavely converge toward the leading end of the body portion and merge with the collars at the smallest cross sections of the intermediate portions with a transitory radius.

The spreading sections have rotationary symmetrical contours except for the ridges which extend along the slots and project beyond the contours.

According to a further facet of the present invention, the internal passage of the body portion which is adapted to receive the threaded element terminates a predetermined distance from an end face of the leading end, such distance at least corresponding to the diameter of the body portion. The slots separating the two spreading portions from one another continue into the leading end portion beyond the end of the internal passage, being bounded thereat by limiting surfaces which have a width substantially corresponding to the diameter of the leading end portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of a dowel according to the present invention;

FIG. 2 is a side elevational view of a dowel of FIG. 1 with detent lugs in their relaxed positions;

FIG. 3 is a cross-sectional view of the anchoring dowel taken on line III—III of FIG. 2;

FIG. 4 is a longitudinal section through a fragment of a support structure with an anchoring hole in which an anchoring dowel according to FIG. 2 is accommodated;

FIG. 5 is a partial cross-sectional view taken on line V—V of FIG. 4;

FIG. 6 is a cross-sectional view of the anchoring dowel taken on line VI—VI of FIG. 2;

FIG. 7 is a somewhat diagrammatic top plan view of the inner side of a spreading section;

FIG. 8 is a diagrammatic perspective view of an anchoring dowel of FIG. 1 which is separated at its trailing end in the continuation of the slot and showing the spreading sections in their spread position and also rotated relative to one another;

FIG. 9 is a top plan view of an anchoring dowel rotated by 90° relative to FIG. 2; and FIG. 10 is a cross-sectional view of the anchoring dowel taken on line X—X of FIG. 2 at a somewhat enlarged scale.

DETAILED DISCUSSION OF THE PREFERRED EMBODIMENTS

Referring now to the drawing in detail, and first to the perspective view of FIG. 1 thereof, it may be seen that an anchoring dowel 1, which is preferably made of one piece of synthetic plastic material, includes a longitudinal slot 4 which extends from a leading end 3 of the dowel 1 toward a trailing end 10 of the dowel 1; the dowel 1 is sleeve-shaped and bounds an internal passage 2 capable of accommodating a non-illustrated conventional connecting screw or a similar threaded element. As particularly well seen in FIG. 2, the internal passage of 2 of the dowel 1 has a cylindrical part 2a at the trailing end 10 of the dowel 1 and gradually decreases in cross section in direction to the leading end portion 3 of the dowel 1. More particularly, the internal passage 2 has a conical zone 37.

The dowel 1 has a spreading region 5 of a substantially rotationally symmetrical contour provided with generally sawtooth-shaped corrugations. Furthermore, the dowel 1 is equiped with two resiliently yeildable detent lugs 110 which extend substantially tangentially of the circumference of the dowel 1 in the threading-in direction of the above-mentioned connecting screw which is indicated in FIG. 1 by the arrow 1a. Each of the detent lugs 110 has a triangular region 105 which, in the relaxed position of the respective lug 110, extends outwardly beyond the circumference of the body portion of the dowel, the triangular regions 105 pointing substantially in the threading-in direction 1a. The detent lugs 110 are pivotally connected to the body portion of the dowel 1 at the side thereof which faces opposite to the direction 1a at a region of merger. The spreading region 5 has two spreading sections 6 and 7, and the two lugs 110 are respectively arranged at the central regions of the two spreading sections 6 and 7, at the narrowing region of the internal passage 2. The above-mentioned triangular region 105 of each detent lug 110 is delimited by a side face 140 which faces in the circumferential direction 1a and increases in distance in direction toward a trailing end portion 10 of the dowel 1, and by an end face 141 which lies substantially along a transverse plane of the dowel 1 and increasingly extending beyond the circumferential contour of the dowel 1 in the direction 1a. The dowel 1 is formed with a pocket-shaped depression 39 underneath the detent lug 110 which is capable of accommodating at least the greater part of the detent lug 110.

According to the present invention, the triangular region 105 of the detent lug 110 has, in its relaxed position, a saddle-shaped configuration at least at its outer surface 130. The side face 140 of the lug 110 has a concave configuration, commencing at and merging with a generatrix of the dowel 1 at its end closer to the leading end 3 of the dowel 1, and the end face 141 is curved in the same sense as the outer circumferential surface of the body portion of the dowel 1.

The triangular region 105 is delimited, at least at its outer surface 130 and in the merger region 131 of the detent lug 110, by a crease 132 which is somewhat curved and deviates from the longitudinal direction of the dowel 1 in the above-mentioned circumferential direction 1a. The overall extension of this crease 132 is so oriented that the crease 132 is somewhat inclined relative to the longitudinal axis 14 of the dowel 1 in the direction 1a, as particularly well seen in FIG. 9.

The pocket-shaped depression 39 has a bottom surface 119 which, as considered in the direction of the longitudinal axis 14 of the dowel 1, extends parallel to the generatrix of the conically converging zone 37 of the internal passage 2, as seen particularly in FIG. 2. In addition thereto, the bottom surface 119 of the pocket-shaped depression 39 extends, at its region which is closer to the leading end 3 of the dowel 1, somewhat more underneath the entire detent lug 110 then corresponds to the projection of the crease 132 onto the bottom surface 119. This can be particularly well ascertained from FIG. 9 where it is illustrated that the bottom surface 119 is delimited by an inner pivot line 134 which is concealed and therefore shown in a dash line. This inner pivot line 134 of the bottom surface 119 is preferably substantially straight. The pivot line 134 is somewhat inclined relative to the longitudinal axis 14 of the dowel 1 in the above-mentioned direction 1a, preferably correspondingly to the inclination of the crease 132. The inner pivot line 134 of the bottom surface 119 of the pocket-shaped depression 39, and the crease 132 which delimits the triangular region 105 of the lug 110 on one side thereof, do not coincide with one another if one were projected into the plane of the other, as far as their shapes are concerned. Correspondingly, the entire detent lug 110 is not connected to the body portion of the dowel 1 at its merger region 131 in the manner of a hinge pivotable about a single axis, but rather the merger region 131 constitutes a somewhat elastic connecting zone which connects the detent lug 110 to the body portion of the dowel 1. The configuration of the pocket-shaped depression 39 with the above-discussed shaping of the bottom surface 119 thereof is relatively simple from the standpoint of the needed machinery and manufacturing operations. In addition thereto, there is obtained, in this manner, the respectively desired elasticity and stability of the detent lug 110, or at least they can be influenced in the desired sense.

As particularly well seen in FIGS. 1, 2 and 9, the detent lug 110 smoothly merges into the contour of the body portion of the dowel 1 at the region of the outer surface 130 thereof which is closer to the leading end portion 3 of the dowel 1. The separating region of the entire lug 110 with respect to the body portion of the dowel 1 is constituted, at the region closer to the leading end portion 3 of the dowel 1, solely by the inner pivot line 134 and a pivot line 136 of the bottom surface 119 of the pocket-shaped depression 39 which is closer to the leading end portion 3 of the dowel 1.

The end faces 141 of the detent lugs 110, when the latter are in their relaxed positions illustrated, for instance, in FIG. 2, extend approximately along a transverse plane of the dowel 1 and transverse surfaces 150 which delimit the respective pocket-shaped depressions 39 next to these end faces 141 and extend substantially parallel thereto. In accordance with a further elaboration on the basic concept of the present invention, the transverse surfaces 150 of the pocket-shaped depressions 39 are arranged at such a distance from the end faces 141 of the lugs 110 that the latter, considering the inclined orientation of the merger region 131, abut an abutment surface of an edge 151 of the transverse surface 150 of the depression 39 as seen in FIGS. 4 and 5. The pocket-shaped depression 39 and the detent lugs 110 have such dimensions that the free edge of a tip 152 of the detent lug 110, which is bounded by the side face 140 and the end face 141, abuts against an abutment region of the outer circumferential surface of the body portion of the dowel 1.

As can be particularly ascertained from FIG. 9, the side face 140 of the detent lug 110, when the latter assumes its relaxed position, extends approximately parallel to the longitudinal central plane of the associated spreading section 6 or 7 of the dowel 1, and this side face 140, when the lug 110 assumes its loaded position, is displaced toward and at least partially into the free region of the pocket-shaped depression 39. The side face 140 is illustrated in FIG. 9 in dash-dotted lines and it may be seen therein that the side face 140 extends approximately in the direction of the longitudinal axis 14 of the dowel 1 at its end which is closer to the leading end portion 3 of the dowel 1, and then extends at a slight curve in direction toward the trailing end portion 10 so that it gradually more deviates from the longitudinal axis 14 of the dowel 1 in the direction 1a of threading-in of the above-mentioned connecting screw. It can also be easily ascertained from FIG. 9 that the tip 152 of the detent lug 110 abuts against the border region bounding the depression 39 at the last third thereof as considered in the direction 1a, whereas the end of the side face 140 of the lug 110 commences at the longitudinal central plane of the associated spreading section 6 of the dowel 1. The detent lugs 110 can be formed with sharp edges in a conventional manner.

Regardless of the fact whether or not the lugs 110 are provided with sharp edges, there is obtained in the dowel 1 of the present invention, as a result of the substantially saddle-shaped configuration of the outer surface 130 of the triangular region 105 of the detent lug 110, a pronouncedly engaging, sharp free edge 152 on the detent lug 110. This free tip 152 is capable of excellently digging into the material of the support structure, especially when such material is relatively soft, such as is the case with foamed concrete, hollow building blocks and the like, to retain the dowel 1 stationarily in the anchoring hole of the support structure once inserted thereinto against turning in the direction 1a as well as against extraction out of the anchoring hole longitudinally of the dowel 1. This can be especially easily achieved in a manner affording good stability in that the tip 152 or the free edge of the detent lug 110 abuts, in the loaded position of the detent lug 110, against the border region bounding the depression 39; in other words, the detent lug 110 does not fully enter the depression 39 in the loaded position thereof. Thus, it is achieved in this manner that the detent lug 110 can perform its function even when the anchoring hole in the support structure is relatively small in diameter, especially when the support structure is of a relatively soft material.

According to a further advantageous concept of the present invention, the thickness of the detent lug 110 and the dimensions of the pocket-shaped depression 39 can be so coordinated with one another that the lower side of the detent lug 110 can still enter the pocket-shaped depression 39 without any difficulty, but the end faces 141 of this detent lug 110 which assume a somewhat inclined position during the displacement of the lug 110 into the pocket-shaped depression 39 come to rest on the edge 151 bounding the pocket-shaped depression 39. Under these circumstances, the detent lug 110 projects to a small degree above the basic contour of the body portion of the dowel 1 as illustrated particularly in FIGS. 4 and 5. However, this projection of the lug 110 beyond the contour of the body portion of the dowel 1 is not so extensive as to cause impairment to the introduction of the dowel 1 into the anchoring hole of the support structure, even when the anchoring hole is a through hole of a relatively thin-walled support structure. The detent lugs 110 still have a certain elasticity so that, if need be, they can still yield within a relatively broad range from the positions illustrated in FIGS. 4 and 5. On the other hand, in such an arrangement, it is assured that the detent lugs 110 will become extended and will be maintained in their extended positions very rapidly, especially at the beginning of the threading of the connecting screw into the dowel 1. The danger that the detent lug 110, if it were fully pressed into its associated pocket-shaped depression 39 and the dowel 1 were accommodated in a very narrow hole bounded by a smooth surface, would remain in the depression 39 and thus be incapable of preventing the rotation of the dowel 1, is largely eliminated. As already mentioned before, the dowel 1 has an axial internal passage 2 for the accommodation of a connecting screw or a similar connecting element. Furthermore, the dowel 1 has a slot 4 which extends from the leading end 3 of the dowel 1, which subdivides the spreading region 5 of the dowel 1 into two spreading sections 6 and 7.

The outer circumferential surface of the body portion of the dowel 1 has been designated with the reference numeral 8 and is equipped, at the spreading region 5 of the dowel 1 with a plurality of conical intermediate portions 9 arranged adjacent one another and having, at their larger bases which face toward the trailing end portion 10 of the dowel 1, annular collars 11.

As can be best ascertained from the comparison of FIGS. 1, 2, 7 and 8, the slot 4 is bounded by a projection 12 and a recess 13 of triangular configurations which are respectively provided at each side of each spreading section 6 and 7. The projections 12 and recesses 13 are so arranged that, geometrically speaking, the base of each projection 12 begins at a lateral surface 16 bounding the dowel slot 4 and the tip of this triangle points approximately normal to the longitudinal central plane of this slot 4. The same is also valid for the recess 13. In addition thereto, the projections 12 as well as the recesses 13 have approximately the configurations of isosceles triangles. At the two sides of the same spreading section 6 or 7, the projections 12 and the recesses 13 are arranged alternatingly opposite one another and, when viewed in the direction of the longitudinal axis 14 of the dowel 1, a respective projection 12 is followed by a recess 13 or vice versa.

Referring now more particularly to FIGS. 2, 3, 6 and 8, it may be seen therein that the slot 4 which separates the spreading sections 6 and 7 is basically straight and is provided with the above-mentioned recesses 13 and projections 12 only in the central zone of the spreading region 5, such projections 12 and recesses 13, of course, deviating from the general straight appearance of the slot 4. These projections 12 and recesses 13 of the two spreading portions 6 and 7 are alternatingly received within one another and the projections 12 overlap the plane of the slot 4 and more particularly also the associated region of the internal passage 2 of the dowel 1. The overlapping takes place to a substantial extent and over a substantial part of the circumference so that a good guidance of the connecting screw or the like connecting element in the internal passage 2 of the dowel 1 is assured.

It may be seen particularly in FIGS. 1, 2, 4 and 6 that bulges 15 are provided at the edges of the slot 4, the bulges 15 following the course of the slot 4. Correspondingly to the zig-zag course of the slot 4 in the central zone of the spreading region 5, the associated bulges 15 which extend over the length of the slot 4 also extend in a zig-zagged fashion.

Upon considering FIG. 6, it will become apparent that the side surfaces of the bulges 15 which face toward the slot 4 of the dowel immediately merge with the side surfaces 16 bounding the slot 4. Thus, the lateral delimitation of the slot 4, as already mentioned before, is constituted by a continuously flat plane, provided that the projections 12 and recesses 13 are disregarded, such plane having a width B which substantially corresponds to the diameter D of the dowel. The annular lands or collars 11 which are arranged at the broader bases of the conical portions 9 have an outer diameter which corresponds to the nominal diameter D of the dowel 1. As a result of the provision of the triangular projections 12 and recesses 13, the slot 4 extends at an angle to the axially parallel generatrixes of the outer surface of the dowel 1 in the central zone of the spreading region 5. According to a further aspect of the present invention, at least one of the annular collars 11 is so located with respect to this inclinedly extending part of the delimitation of the slot 4 that an end face 17 of this annular collar 11 which faces toward the trailing end 10 of the dowel 1 encloses an acute angle $\alpha$ with the surface 16 delimiting the slot 4.

Referring now in particular to FIGS. 1 and 6 it may be seen therein that the radial distance to which the bulges 15 extend is smaller than the radius of the annular collars 11. As a result of this, there is obtained not only an additional profiling, but also, in connection with the formation of the above-mentioned angle $\alpha$, there are obtained edges 18 at the outer surface 8 of the dowel 1 which are capable of additionally retaining the dowel 1 in the anchoring hole of the support structure, augmenting the action of the lugs 110. These sharp edges 18 are already arranged in the center of the spreading region 5, that is, substantially deeper in the anchoring hole than the detent lugs 110. In addition thereto, these sharp edges 18 are relatively stable inasmuch as they are formed on the sturdily built annular collars 11. Thus, these sharp edges 18 are capable of, on the one hand, digging into a soft material of the support structure and, on the other hand, abutting against and being retained by indentations in a relatively hard material of the support structure. When the torque which is needed for the threading in of the connecting screw increases accompanied by an increase in the spreading forces, the dowel 1, as a result of the above-mentioned profiling, can be additionally retained against rotation even in the central zone of the spreading region 5, that is, at a relatively large depth of the anchoring hole. This brings about another advantage that the task of securing the dowel 1 against rotation during the threading in of the connecting screw need not be only performed by the detent lugs 110. As a concomitant thereof, the torsional stress of the body portion of the dowel 1 is reduced, among others also because the retention of the dowel 1 against a rotation in an anchoring hole 19 takes place at a region of the dowel 1 where a strengthened engagement by the screw takes place during a deeper penetration of the connecting screw into the internal passage 2 of the dowel 1.

The comparison of FIGS. 1 and 2 will reveal that the length of the inclined surfaces bounding the projections 12 and the recesses 13, or, in other words, the length of the inclined surfaces within the zig-zagged region of the slot 4, on the one hand, and the distance between the annular collars 11 at least in this zig-zagged region, on the other hand, are so coordinated that the edges 21 of the annular collars 11 which point in the direction toward the leading end 3 of the dowel 1 intersect a corner of a respective projection 12 or recess 13, that is, a corner of the zig-zagged region of the slot 4. As a result thereof, there is obtained an especially engageable profile at least when the spreading region 5 of the dowel 1 is somewhat spread. More particularly, when the material of the support structure is soft relative to the material of the dowel 1, the spreading region 5 of the dowel 1 can easily work into the surface of the support structure which bounds the anchoring hole 19. The above-discussed geometrical configuration and the dowel material distribution which results therefrom simultaneously assure a relatively uniform presence of the material of the dowel 1 at the desired places as it is required when the dowel 1 is to be accommodated in an anchoring hole in a support structure of a relatively hard material, such as concrete.

The spatial edge 18 which is enclosed between the end face 17 of the annular collar 11 which faces the trailing end 10 of the dowel 1 and the inclined section of the slot 4, which has been already mentioned previously, is coordinated to the threading-in direction 1a of the connecting screw which is associated with the dowel 1 so as to be able to perform its function as a rotation-preventing arrangement.

Generally speaking, a multitude of projections 12 and recesses 13 could be provided at each lateral region of each spreading section 6 or 7. However, an especially advantageous embodiment of the present invention contemplates that only one projection 12 and only one recess 13 are provided at each lateral region of each spreading section 6 or 7 and these projections 12 and recesses 13 are so distributed with respect to one another along the slot 4 of the dowel 1 that the two dowel spreading sections 6 and 7 have the same configuration. This shaping of the spreading section 6 and 7 not only facilitates the manufacture of the dowel, but also gives the dowel 1 uniform and symmetrical properties which is especially important during the threading-in of the connecting screw.

As can be best ascertained from FIG. 4, the inclined surfaces 22 and 23 delimiting the projections 12 and the recesses 13 enclose an angle $\beta$ amounting to substantially 120°. A dash-dotted line 24 indicates the theoretical base of a triangle corresponding to the projection 12. The two inclined surfaces 22 and 23 of the projection 12 are of the same length so that the projection 12 has an outline of an isosceles triangle. The same is also true for the recess 13; however, as compared to the projection 12, the width of the slot 4 has to be taken into consideration. As a consequence thereof, even the inclined surfaces 22a and 23a which bound the recesses 13 give the latter an outline of a corresponding isosceles triangle.

As already mentioned before, the respective projection 12 and the respective recess 13, and thus the resulting zig-zagged outline of the dowel slot 4 are located approximately in the center of the spreading region 5. In this manner, it is assured that the additional engagement of the dowel 1 in the anchoring hole 19 which is rendered possible by the presence of the projections 12 is located in a region where a relatively huge spreading action takes place at a sufficient depth of the anchoring hole 19. For the same reason, the use of only one projection 12 at each side of each spreading section 6 or 7 is advantageous in that then this projection 12 can be made desirably sturdy and can be located at the proper relative position with respect to the annular collars 11.

The upper sides 25 and the lower sides 26 of the bulges 15 extend parallel to the dowel slot 4 so that these bulges 15 have a substantially rectangular configuration with parallel upper and lower sides 25 and 26, as seen in FIGS. 2 and 6. This has been proven to be advantageous not only for the manufacture of the dowel 1, but also for the retention of the dowel in the anchoring hole 19.

When now FIGS. 2 and 4 are considered, it will become apparent that the generatrix 27 of the conical portions 9 is concavely curved as viewed in the axial direction of the dowel 1. In this context, it is to be mentioned that this generatrix 27 merges at the smallest diameter of the conical portion 9 with a small radius into the end face 17 of the adjacent annular collar 11. Also, the concave shape of the generatrix 27 is so selected that the generatrix 27 extends substantially parallel to the longitudinal axis 14 of the dowel 1 in the vicinity of the above-mentioned adjacent annular collar 11.

Referring now to FIGS. 1, 2 and 6, it may be seen therein that the dowel 1 is rotationally symmetrical except for the bulges 15 and the detent lugs 110. This means that the annular collars 11 are fully rotationally symmetrical and the conical portions 9 are rotationally symmetrical in their zones located between the bulges 15. Even this contributes to the desired distribution of the material of the dowel 1 and the formation of detent surfaces. Furthermore, as a result of the concave curvature of the outer surfaces in the region of the conical portions 9, especially of the conical portion 9 which is located at the leading end portion 3 of the dowel 1, the introduction of the dowel 1 into a respective anchoring hole 19 is greatly facilitated, particularly when the dowel is to be introduced into a through hole 19 in a relatively thin-walled support structure.

It may be further seen in the drawing, particularly in FIGS. 2, 3 and 5 to 8, that the lateral surfaces 16 bounding dowel slot 4 lie along a plane except for the presence of the projections 12 and the recesses 13.

An advantage of the present invention also resides in a combination of features according to which the dowel 1 is provided at least in the spreading region 5 with circumferentially complete conical portions 9 which are preferably provided with annular collars 11 at their larger bases. Then, the dowel slot 4 is provided with triangular projections 12 and recesses 13 which are adjusted to one another, and there are provided bulges 15 at the two borders bounding the slot 4, which bulges reinforce the borders and extend radially outwardly beyond the conical intermediate portions 9, the bulges extending in a zig-zagged fashion corresponding to the course of the slot 4 in that region.

The dowel 1 according to the present invention achieves in a very advantageous manner the two seemingly contradictory requirements which call, on the one hand, for the spreading region 5 of the slotted dowel 1 to have an achievably uniform material distribution even under the consideration of the presence of the dowel slot 4 and, on the other hand, for the dowel 1 to have such a surface configuration in the spreading region 5 that it be capable of firm engagement with the surface bounding the anchoring hole 19 in the support structure by possibly digging into the material of the support structure. Thus, the dowel 1 of the present invention is perfectly suited for use in anchoring holes 19 of support structures of a soft material or of a hard material and, of course, any material whose hardness is intermediate these two extremes. The dowel 1 of the present invention is so constructed that an additional retention of the dowel 1 in the anchoring hole 19 is obtained at the spreading region 5 of the dowel 1, and possibly also the dowel 1 is retained at this spreading region 5 against extraction from the anchoring hole 19. According to a further aspect of the present invention, the ridges 15 can be produced in an embossing operation, whereby an additional substantial advantage is obtained that an additional arresting of the dowel 1 in the anchoring hole 19 against rotation is obtained without additional manufacturing cost, which becomes active exactly at the moment when the torque applied to the dowel 1 by the screw being threaded thereinto achieves its highest value, in which situation the dowel 1 is already spread to a relatively great extent.

FIG. 9 also shows in some detail the position of the bulges 15 with respect to the borders of the slot 4 provided at the conical portions 9. It may further be seen in FIG. 9 that the radial distance 28 of the remotest points of the bulges 15 is somewhat smaller than the diameter D of the dowel 1. As particularly evident from FIGS. 2, 7 and 8, the internal passage 2 narrows in direction from the trailing end portion 10 of the dowel 1 toward the leading end portion 3 of the dowel 1. The internal passage 2 of the dowel 1 terminates at a distance a short of the leading end 3 of the dowel 1. The distance a is so selected that it at least equals the diameter D of the dowel. Preferably, the internal passage 2 can terminate approximately at the point where the projections 12 or recess 13 which is closest to the leading end 3 of the dowel 1 terminates. This is illustrated in FIG. 2 wherein only the converging portion 2b of the passage 2 extends beyond the end of the projection 12 or recess 13 which is closest to the leading end 3 of the dowel 1. However, it is also possible and contemplated by the present invention that the internal passage 2 extends somewhat beyond the above-mentioned end of this projection 12 or recess 13 in the direction toward the leading end 3 of the dowel 1, such as to a distance b which approximates one half of the diameter D of the dowel 1.

It will be understood that each of the elements described above, or two or more together, may also find a useful application in other types of constructions differing from the types described above.

While the invention has been illustrated and described as embodied in a spreadable anchoring dowel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An anchoring dowel comprising, in combination, an elongated body portion having a leading end, a trailing end and an outer circumferential surface which is curved in cross-section, said body portion also having substantially longitudinally extending slots at said leading end, which subdivide the latter into at least two spreading sections having respective projections and recesses of triangular configurations forming respective tips, said projections and recesses bounding said slots so that the projections of one of said spreading sections extend into the respective recesses of the other of said spreading sections to give said slots zig-zagged configurations at least along a portion of the elongation of said slots, said leading end being provided with annular retaining collars having opposite circumferential edges, and intermediate portions therebetween, said projections and recesses being so located relative to the respective intermediate portions between said retaining collars that said respective tips are located on said circumferential edges of the respective annular collars; and at least one detent lug elastically yieldably connected to said body portion at a merger region and projecting outwardly beyond said outer circumferential surface of said body portion at least in a relaxed condition, said lug having an outer concave face of a substantially saddle-shaped configuration which merges with said outer circumferential surface of said body portion at said merger region, an elongated side face commencing at and generally merging into a generatrix of said outer circumferential surface at its end which is closer to said leading end and having a concave configuration, and an arcuate end face extending from said merger region generally in a circumferential direction of said body porton and being curved in the same manner as said outer circumferential surface of said body portion.

2. An anchoring dowel as defined in claim 1 for use with a threaded element to be partially threadingly received therein, wherein said circumferential direction is the threading-in direction of the threaded element.

3. An anchoring dowel as defined in claim 1, wherein said body portion has a depression juxtaposed with said lug and operative for receiving at least the greater part of said lug when the latter is subjected to inwardly oriented forces.

4. An anchoring dowel as defined in claim 1, wherein at least said outer face of said lug is delimited at said merger region by a crease which is curved and deviates from the elongation of said body portion in said circumferential direction.

5. An anchoring dowel as defined in claim 4, wherein said bottom face of said depression extends at least at a zone thereof which is closer to said leading end beyond a projection of said crease onto said bottom surface, being delimited by a pivot line thereat.

6. An anchoring dowel as defined in claim 5, wherein said pivot line is inclined in said circumferential direction with respect to the elongation of said body portion.

7. An anchoring dowel as defined in claim 6, wherein said outer circumferential surface of said body portion has an abutment region; and wherein said lug has a tip which abuts against said abutment region when said lug is subjected to inwardly oriented forces.

8. An anchoring dowel as defined in claim 3, wherein said side face extends substantially parallel to a longitudinal axis of said body portion in said relaxed condition of said lug; and wherein said lug assumes a position at least partially within said depression when subjected to inwardly oriented forces, in which said side face extends substantially parallel to said longitudinal plane only at said one end thereof and gradually deviates from said longitudinal plane in said circumferential direction towards its free other end.

9. An anchoring dowel as defined in claim 8, wherein said end face and said side face delimit a tip of said lug at said other end of said side face; and wherein said body portion has an abutment surface at a last third of said depression as considered in said circumferential direction against which said tip abuts in said loaded position thereof.

10. An anchoring dowel as defined in claim 1, wherein said slots so bisect at least one of said collars that a face of said one collar which faces toward said trailing end encloses acute angles with said slots.

11. An anchoring dowel as defined in claim 10, wherein said projections and recesses have respective corners which are located at least at said one collar.

12. An anchoring dowel as defined in claim 1, wherein said projections and recesses are respectively bounded by border surfaces; and wherein said border surfaces enclose an angle of between 100° and 140° with one another.

13. An anchoring dowel as defined in claim 1, wherein said intermediate portions concavely converge toward said leading end and merge with said collars at the smallest cross sections of said intermediate portions with a transitory radius.

14. An anchoring dowel as defined in claim 1, wherein said spreading sections have rotationally symmetrical contours; and wherein said spreading sections have ridges extending along said slots and projecting beyond said contours.

* * * * *